United States Patent

[11] 3,624,014

| [72] | Inventors | Robert A. Moore<br>Park Forest;<br>Patrick W. Ryan, Chicago Heights, both of Ill. |
|---|---|---|
| [21] | Appl. No. | 754,982 |
| [22] | Filed | Aug. 23, 1968 |
| [45] | Patented | Nov. 30, 1971 |
| [73] | Assignee | Atlantic Richfield Company |

[54] REACTIONS PRODUCTS OF AN ORTHO-SILICATE AND A HYDROXY TERMINATED DIENE POLYMER AND THE PREPARATION THEREOF
10 Claims, No Drawings

[52] U.S. Cl.................................................. 260/18 S,
117/161 UC, 117/161 UD, 117/161 ZA, 260/2 S,
260/5 R, 260/28.5 AS, 260/46.5 R, 260/83.5 R,
260/85.1 R, 260/85.5 S, 260/894 R
[51] Int. Cl........................................................ C08f 21/01
[50] Field of Search............................................ 260/46.5, 2
SI, 18 SI, 94.7

[56] References Cited
UNITED STATES PATENTS
3,346,664 10/1967 Yuhas, Jr. et al............ 260/827
3,427,366 2/1969 Verdol et al................. 260/859

*Primary Examiner*—Donald E. Czaja
*Assistant Examiner*—M. I. Marquis
*Attorneys*—John W. Behringer, Eugene L. Bernard, Martin J. Brown, James N. Dresser, W. Brown Morton, Jr., John T. Roberts and Malcom L. Sutherland ABSTRACT: Stable polymeric gels are obtained as reaction products of tetraalkyl ortho-silicates, such as tetraethyl orthosilicate, and an intermediate polyhydroxy polymer having an average of at least about 1.8 predominantly primary, terminal, allylic hydroxyl groups per molecule. These intermediate polyhydroxy polymers are addition polymers containing 0 to about 75 percent by weight of the residue of an alpha-monoolefin of two to about 12 carbon atoms, such as styrene or acrylonitrile, and about 25 to 100 percent by weight of the residue of a 1,3-diene of four to about 12 carbon atoms, such as butadiene. The intermediate polyhydroxy polymer has the majority of its unsaturation in the main carbon chain, has a viscosity at 30° C. of about 5–20,000 poises, and has a number average molecular weight of about 400 to 25,000. The equivalent ratio of tetraalkyl ortho-silicate to the intermediate polyhydroxy polymer can be varied broadly, such as from about 0.25 or lower to 3 or more, and preferably is about 1 to 2. Reaction resulting in gel formation occurs at ambient temperatures, such as 20° C., or higher, in contact with a catalytic amount of an alkanoic acid metal salt of tin, lead or cobalt, such as stannous octoate or dibutyl tin dilaurate. These polymeric gels vary from sticky gels to firm gels and, as they can be prepared at ambient temperatures, have utility in coatings and in casting of heat-sensitive articles. They can be mixed with asphalt or with rubber for use in rubber articles as rubber floor tile. These stable polymeric gels are also suitable, as prepared, for use as potting and encapsulating compounds.

REACTIONS PRODUCTS OF AN ORTHO-SILICATE AND A HYDROXY TERMINATED DIENE POLYMER AND THE PREPARATION THEREOF

This invention relates to polymeric ortho-silicate ester gels. More particularly, this invention relates to stable polymeric gel reaction products of tetraalkyl ortho-silicate esters and certain hydroxyl-terminated polydiene resins.

Heretofore, hydroxyl-terminated polydiene resins have been reacted with diisocyanates to form urethanes which are useful for many purposes. However, it is highly desirable to produce stable gels of hydroxyl-terminated polydiene resins with reactants which are relatively nontoxic in comparison to diisocyanates. It is also desirable to prepare stable gels of hydroxyl-terminated polydiene resins with a reactant at ambient temperature and thus provide utility in the casting of heat-sensitive articles.

In accordance with this invention, there are provided stable polymeric gels which are the reaction products of a tetraalkyl ortho-silicate and an intermediate polyhydroxy polymer having an average of at least about 1.8 predominantly primary, terminal, allylic hydroxyl groups per molecule. These intermediate polyhydroxy polymers are addition polymers containing 0 to about 75 percent by weight of the residue of an alpha-monoolefin of two to about 12 carbon atoms, and about 25 to 100 percent by weight of the residue of a 1,3 1,3-diene four to about 12 carbon atoms. The intermediate polyhydroxy polymer has the majority of its unsaturation in the main carbon chain, has a viscosity at 30° C. of about 5–20,000 poises, and has a number average molecular weight of about 400 to 25,000. There can be used advantageously in the present invention, as the intermediate polyhydroxy polymer, hydroxyl-terminated liquid homopolymers and copolymers of butadiene, isoprene, and chloroprene with other reactive comonomers, such as alkyl acrylates and methacrylates, acrylonitrile and styrene.

The alkyl groups of the tetraalkyl ortho-silicate ester can be up to about 12 carbon atoms or more, and preferably are lower alkyl of say one to about six carbon atoms. Tetraethyl ortho-silicate is representative of these alkyl ortho-silicates useful in this invention. It has been found that the hydroxyl-terminated polydiene resin reacts with the tetraalkyl ortho-silicate ester to form stable gels which vary from sticky to firm gels, suitable, as prepared, for use as potting and encapsulating compounds. These stable gel compounds can also be used as adhesives, sealants, binders, and coatings.

The polymeric stable gels of this invention can be prepared by mixing the tetraalkyl ortho-silicate with the hydroxyl-terminated polydiene resin and a small amount, effective to catalyze the reaction, of a catalyst, for instance, a metal salt of an acid, such as alkanoic acid salts of tin, lead and cobalt. Illustrative of such metal acid salt catalyst are stannous octoate, dibutyl tin dilaurate and similar metal salts of fatty acids having for example up to about 20 carbon atoms. Only a small amount of the metal acid salt sufficient to catalyze the reaction need be used, such as about 1 percent or less to 5 percent or more, preferably about 2 to 4 percent by weight based on the hydroxyl-terminated polydiene resin.

The mixture of tetraalkyl ortho-silicate, hydroxyl-terminated polydiene resin, and metal acid salt catalyst can be allowed to remain until gel formation occurs which is usually within 16 hours or less. The chemical reaction proceeds at room temperature (20° C.) open to the atmosphere although curing of the reaction mass with gel formation can be obtained at higher temperatures up to about 100° C. or higher, if desired. The use of small amounts of water in the mixture, such as up to about the stoichiometric amount for complete hydrolysis of the silicate ester, speeds up gel formation by increasing the rate of hydrolysis of the silicate ester. However, the addition of larger amounts of water alters the stoichiometry of the tetraalkyl ortho-silicate ester and of the intermediate polyhydroxy polymer and results in more sticky, uncured gels as the amount of water added is increased.

The equivalent ratio of tetraalkyl ortho-silicate ester to hydroxyl-terminated polydiene resin can be varied from about 1.0 or lower, such as about 0.25, to about 3, or more with the preferred ratio being from about 1 to 2 up to about 3. The tetraalkyl ortho-silicate ester in this reaction can be considered tetrafunctional and, hence, provides cross-link sites for hydroxyl-terminated polydiene resins particularly those having a hydroxyl functionality of at least 2, or more, such as about 2.1 to 3. The equivalent ration of 1 mole of tetraalkyl ortho-silicate, which has four alkyl ester groups and thus a functionality of four, to 1 mole of hydroxyl-terminated polydiene resin, having two hydroxyl groups and thus a functionality of two, is two. The equivalent ratio is obtained by dividing the number of alkyl ester groups per molecule times the moles of tetraalkyl ortho-silicate by the number of hydroxyl groups per molecule times the moles of hydroxyl-terminated polydiene resin.

The tetraalkyl ortho-silicate ester can be partially or completely hydrolyzed with hydroxyl groups of the hydroxyl-terminated polydiene resins. The linkage between the tetraalkyl ortho-silicate ester and the hydroxyl-terminated polydiene resin is a silicon-oxygen-carbon linkage. Hydroxyl-terminated polydiene resins gelled by ortho-silicate esters provide increased thermal stability to the polymer system. These polymeric gels, like silicone rubbers, exhibit outstanding electrical properties.

The reaction between tetraethyl ortho-silicate and hydroxy-terminated polybutadiene proceeds to produce the gels of this invention according to the following equation:

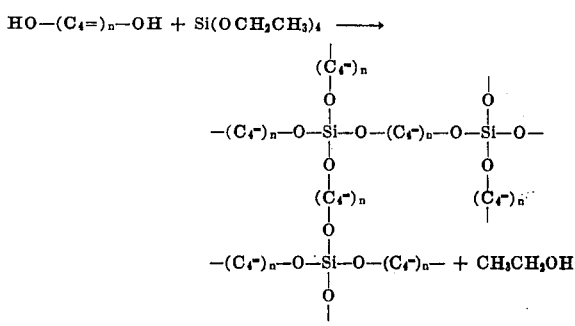

The polymer network formed builds in two directions rather than solely by chain-extension in one direction. Hence cross-linked rather than linear chains are formed. This theory of the mechanism of the reaction is advanced for a better understanding of the invention and is not to be considered as limiting the products or process of the invention in any way.

The hydroxy-terminated polydiene-tetraalkyl ortho-silicate reaction products of this invention can be used to advantage as gel agents in preparing gelled asphalts by simply mixing from about 1 to 50 percent or more of the polymeric gel by weight of uncured asphalt. These polymeric gels can also be used in admixture with silicone oil as well as hydrocarbon oils and resins.

The polymeric gels of this invention can be prepared at ambient temperatures, are castable as self-curing liquids, and thus have utility in the casting of heat-sensitive articles; for example, they are of use as binders for solid fuels. These polymeric gels are self-curing and are useable as prepared for potting and encapsulating. No secondary cross-linking step or additional coupling step need be employed as no further cure is necessary. These polymeric gels can be used in coatings for pipes, tanks and the like. They can be mixed and worked with rubber for use in may applications, such as in rubber floor tile and other rubber articles.

The intermediate polyhydroxy polymers have an average of at least about 1.8 predominantly primary, terminal, allylic hydroxyl groups per molecule and are an addition polymer containing 0 to about 75 percent by weight of the residue of an alpha-monoolefin of two to about 12 carbon atoms and about 25 to 100 percent of the residue of a 1,2-diene of four to about 12 carbon atoms, the intermediate polyhydroxy polymer having a viscosity at 30° of about 5–20,000 poises, having the majority of its unsaturation in the main carbon chain, and a number average molecular weight of about 400 to 25,000. The intermediate polyhydroxy polymers used in this invention are particular hydroxyl-terminated polymers and copolymers of dienes with other reactive monomers and can be prepared by the hydrogen peroxide-isopropanol mutual solvent process described hereinafter. In addition, suitable derivatives derived therefrom are also applicable provided the alcohol moiety of the polymer with its primary, terminal, allylic structure remains intact. These include partially hydrogenated or halogenated hydroxyl-terminated polybutadiene resins having the majority of their unsaturation in the main carbon chain.

The intermediate polyhydroxy polymer has a particular structure and contains allylic hydroxyl groups, which usually are at the ends of the main, that is the longest, hydrocarbon chain of these usually liquid diene polymers. These intermediate polyhydroxy polymers differ from the homopolymers and copolymers of butadiene and related dienes which are commercially available as GR-S rubber, etc. The intermediate polyhydroxy polymers may, in general, have a viscosity at 30° C., of about 5–20,000 poises, preferably about 15 to 5,000 poises. Often the intermediate polymer, when a homopolymer, is obtained in a viscosity range of about 20 to 300 or up to about 550 poises at 30° C. Preferably, the intermediate polyhydroxy polymers have a viscosity of about 35 to 60 or up to about 190 to 260 poises. Thus, the intermediate polyhydroxy polymers are liquids or semisolids flowable, at least when subjected to moderate pressure, at ambient temperatures or at temperatures up to about 400° F. The allylic hydroxy-terminated intermediate polymers used in the present invention will have molecular weights in the range of about 400 to about 25,000 as determined by cryoscopic, ebullioscopic or osomometric methods. The preferred hydroxyl-containing diene polymers will be in the molecular weight range of about 900 to 10,000 In contrast, conventional diene polymers such as GR-S rubber are extremely high in molecular weight, e.g., in the range of several hundred thousand.

The hydroxy-terminated diene intermediate polymers employed to make the novel gels of this invention differ from diene polymers known to be telechelic and/or hydroxy-containing in that the majority of unsaturation in the former is in the main hydrocarbon chain and in that the hydroxy components are in predominantly terminal positions on the main hydrocarbon chain and are predominantly primary and allylic in configuration. Ordinarily, at least about 1.8, often at least about 2, frequently 2.1 to 2.18 and up to about 3 or more hydroxyl groups are present on the average per intermediate polymer molecule. Since these hydroxyl groups are predominantly primary, terminal and allylic in structure, with approximately two of the hydroxyl groups being at terminating positions on the main carbon chain, the polymers are highly reactive. The intermediate polyhydroxy polymer has the majority of its unsaturation in the main hydrocarbon chain and this appears to provide polymers of improved elasticity characteristics.

The diene hydrocarbons which are employed to make the intermediate polymers include the unsubstituted, 2-substituted or 2,3-disubstituted 1,3-dienes of four up to about 12 carbon atoms The diene preferably has up to six carbon atoms and the substituents in the 2- and/or 3-position may be hydrogen alkyl, generally lower alkyl, e.g. of one to four carbon atoms, aryl (substituted or unsubstituted), halogen, nitro, nitrile, etc. Typical dienes which may be employed are 1,3-butadiene, isoprene, chloroprene, 2-cyano-1,3-butadiene, 2,3-diemethyl-1,3-butadiene, 2-phenyl-b -1,3-butadiene, 2-methyl-3-phenyl-1,3-butadiene etc. The choice of diene will usually depend upon properties desired in the final elastomer, for example, chloroprene may be used, alone or in admixture with other dienes to produce oil-resistant and flame-proof rubbers.

Although intermediate polymers of the above described type, averaging more than one predominantly primary hydroxyl per molecule, say about 1.8 to 3 or more per molecule, may be employed in this invention, they preferably have an average of greater than two or about 2.1 to 2.4 up to 2.8 or three hydroxyl groups per molecule and the hydroxyl groups are predominantly in terminal, allylic positions on the main, generally longest, hydrocarbon chain of the molecule. By "allylic" configuration is meant the alpha-allylic grouping of allylic alcohol, that is the terminal hydroxyls of the intermediate polymer are attached to a carbon adjacent to a double-bond carbon. Preferably, the polymer is substantially free of other hydroxyl groups in order to avoid indiscriminate premature or excessive cross-linking.

The ratio of cis-1,4 and trans-1,4 and 1,2-vinyl unsaturation which occurs in the diene polymers used in the present invention, the number and location of the hydroxyl groups and the molecular weight of the intermediate polymers can be a function of polymerization temperature and the type of addition polymerization system employed in forming the polymer. It has been found that diene polymers of the desired configuration can be obtained using hydrogen peroxide as the catalyst for polymerization in a mutual alcohol solvent system. This free-radical addition polymerization usually takes place in solution at a temperature of about 30° C. to about 200° C., preferably about 100–150° C.

The reaction preferably takes place in a mutual solvent system; that is, one which dissolves both the diene monomer and the hydrogen peroxide. Suitable solvents are isopropanol, methanol, sec-butanol, n-butanol, n-propanol, and like saturated alcohols, preferably alkanols having two to about 12 carbon atoms. The $H_2O_2$-solvent- system is found to supply hydroxyl groups and the catalytic and solvent effects needed to produce the intermediate diene polymers of desired chemical and physical characteristics. In such a polymerization system, the alcohol serves as a solvent for the peroxide and as a solvent or diluent for the diene monomer and is used in an amount suitable to promote adequately rapid but controllable polymerization of the monomer material in the solution to form the diene polymers. The alcohol will be free of any group which would interfere with the production of the desired diene polymer. Saturated alcohols are preferred and often those having about the same carbon atom content as the diene monomer will be found most useful. Thus, propanol or isopropanol is often used in butadiene polymerization. The $H_2O_2$-alcohol system may also contain ketones, ethers, alcohol-ketones, alcohol-ethers and alcohol-esters which are miscible in water in all proportions and which do not contain polymerizable carbon-to-carbon unsaturation or otherwise interfere with polymerization or enter into the product. The peroxide material may be used in amounts of about 1 percent to 15 percent of the reaction mixture to assure a low molecular weight addition polymer product having more than two hydroxyl groups per molecule.

The usable intermediate polyhydroxy polymers of butadiene will have the majority of their unsaturation in the main carbon chain and will conform to the following simplified chemical structure:

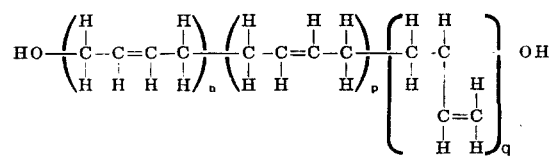

in which $n$ plus $p$ is greater than $q$, that is the in-chain unsaturation accounts for more than 50 percent of the unsaturation. One or more of the hydrogens appearing in the above formula may be replaced by hydroxyl in some of the molecules. This formula should not be understood as implying that the polymers are necessarily in blocks, but the cis-1,4-, trans-1,4- and vinyl (1,2) unsaturation are usually distributed throughout the polymer molecule. Generally $n$ will be a number sufficient to give a cis-1,4-unsaturation content of about 10–30 percent; $p$ will be a number sufficient to give a trans-1,4-unsaturation content to the polymer in the range of about 40–70 percent while $q$ will be sufficient to give a pendant 1,2-vinyl unsaturation of about 10–35 percent. Often the polymer will contain largely trans-1,4-units, e.g., about 50–65 percent, and about 15–25 percent cis-1,4- units, with about 15–25 percent 1,2- units. Branching may also occur in the above polymers, especially those prepared at higher temperatures. These hydroxyl-terminated polybutadiene resins are usually low molecular weight liquid polymers composed mainly of butadiene units in their backbone structure.

Olefinically unsaturated monomers may be incorporated into the diene intermediate polymer products used in this invention and these may often be components which provide cross-linking sites. Usable monomers include alpha-monoolefinic materials of about two or three to 10 to about 12 carbon atoms, such as styrene, vinyl toluene, methyl methacrylate, methylacrylate, acrylic esters, vinyl chloride, vinylidene chloride, etc. Acrylonitrile, acrylic acid, vinylidene cyanide, acrylamide, etc., provide low-molecular weight hydroxy-terminated diene intermediate copolymers which have sites suitable for cross-linking. As can be seen, the usable olefinic monomers may be ethylenes, substituted with halogen, aromatic hydrocarbon, or even cyano or carboxyl-containing radicals in some instances. The choice and amount of monoolefinic monomer employed will often be determined on the basis of properties desired in the final elastomer resin. For example, solvent-resistant rubbers may be formulated by copolymerization of butadiene with acrylonitrile, or other monoolefin, substituted with a nonhydrocarbon radical, to produce the intermediate polymer. Generally the amount of monoolefinic monomer in the polymer will be 0 to about 75 percent by weight of the total addition polymer, preferably about 1 to 40 percent or even about 10–40 percent, and the balance can be essentially the 1,3 diene.

In addition to the homopolymers and the copolymers comprised of single dienes and single monoolefinic or vinyl monomers, the present invention may also use the intermediate polymers made from combinations of a plurality of dienes and mono-olefinic monomers. For example, mixtures of butadiene, isoprene and styrene can be polymerized to afford low molecular weight hydroxyl-containing interpolymers. Various combinations of dienes and monoolefinic monomers may be copolymerized to produce hydroxyl-containing copolymers or interpolymers which may be used to form elastomers. Also, the polymer materials used in this invention may be given improved oxidation and ozone resistance by hydrogenating the hydroxyl-containing diene polymers to their corresponding more-saturated derivatives. Usually, the hydroxyl-containing diene polymers used in the present invention will at most be only partially hydrogenated, so as to provide a material which is more stable due to diminished unsaturation but which still has good elastomer properties.

The present invention will be further illustrated by the following examples.

EXAMPLE A

Four hydroxyl-terminated polybutadiene polymers are described as being exemplary of those which can be used in the present invention.

Polybutadiene 45 is a polyhydroxybutadiene homopolymer typically having a viscosity of 216 poises at 30° C., a hydroxyl content of 0.80 to 0.84 meg./gm., a hydroxyl number (mg.KOH/gm.) of 2.7, an average molecular weight of about 2600 to 2700, about 2.1 to 2.3 terminal, allylic hydroxyl groups which are predominantly primary, and an iodine number of 395. The polymer can be prepared by polymerizing 100 parts of butadiene in the presence of 70 parts of isopropanol and 10 parts of hydrogen peroxide in an aluminum clad autoclave at 118° C. for 2 hours.

Polybutadiene 15 is a polyhydroxybutadiene homopolymer typically having a viscosity at 30° C. of 170 poises, a hydroxyl content of 0.71 meq./gm. a hydroxyl number (mg.KOH/gm.) of 45, an average molecular weight of about 2600 to 3400, about 2.1 to 2.4 terminal, allylic, hydroxyl groups which are predominantly primary and an iodine number of 395. This polymer can be made by polymerizing 100 parts of butadiene in the presence of 35 parts of isopropanol and 6 parts of hydrogen peroxide for 2½ hours at 130° C.

Styrene-butadiene copolymer 15 has a molecular weight of about 3400, a viscosity at 30° C. of 225 poises, a hydroxyl content (meq./gm.) of 0.71 a hydroxyl number of 50 mg.KOH/gm. about 2.4 terminal, allylic, hydroxyl groups which are predominantly primary; and an iodine number of 335. The copolymer is made by polymerizing 75 parts butadiene and 25 parts styrene in the presence of 70 parts isopropanol and 10 parts of 50 percent hydrogen peroxide for 2½ hours at 120° C.

Polybutadiene-acrylonitrile copolymer 15 is typically has a viscosity of 570 poises at 30° C., a hydroxyl content of 0.62 meg./gm., and hydroxyl number of 215 mg.KOH/gm., and can have an average molecular weight of about 2600 to 4000, about 2.1 to 2.5 terminal, allylic hydroxyl groups, which are predominantly primary, and an iodine number of 345. This polymer can be made by copolymerizing acrylonitrile with butadiene in isopropanol solvent and in the presence of hydrogen peroxide using the following ratio of reactants: 85 parts butadiene, 15 parts acrylonitrile, 70 parts isopropanol, 10 percent hydrogen peroxide. The reactants are heated in an autoclave at 118° C. for 1½ hours and stripped.

The following examples are illustrative of various embodiments of this invention and include preferred embodiments.

EXAMPLE I

A polyhydroxybutadiene-ethyl ortho-silicate ester gel is prepared by weighing into a vessel 100 g. of polybutadiene 45 (having an average molecular weight of 2600 and a hydroxyl content of 0.80 meq./g.), 4 g. of tetraethyl ortho-silicate, and 4 g. of stannous octoate catalyst. The equivalent ratio of tetraethyl ortho-silicate to polybutadiene 45 is 1. These reactants are thoroughly mixed, after which the reacting mixture is transferred to another vessel and allowed to remain opened to the atmosphere overnight. Upon inspection the following morning gel formation had occurred. The reaction product is a sticky gel.

Another gel is prepared in a similar manner with 8 g. of tetraethyl ortho-silicate, 100 g. of polybutadiene 45, and 4 g. of stannous octoate catalyst. The equivalent ratio of tetraethyl ortho-silicate to polybutadiene 45 is 2. The reaction product is a firm gel.

A third gel is prepared in a similar manner with 8 g. of tetraethyl ortho-silicate, 100 g. of polybutadiene 45, 4 g. of stannous octoate catalyst, and also with the addition to the mixture of 0.2 g. of water. The reaction product is a firm gel.

A fourth gel is prepared in a similar manner with 12 g. of tetraethyl ortho-silicate, 100 g. of polybutadiene 45 and 4 g. of stannous octoate catalyst. The equivalent ratio of tetraethyl ortho-silicate to polybutadiene 45 is 3. The reaction product is a firm gel.

EXAMPLE II

An ethyl ortho-silicate ester gel of a polyhydroxy copolymer of butadiene and acrylonitrile is prepared by weighing into a vessel 100 g. of polybutadiene-acrylonitrile copolymer 15 (having an average molecular weight of 2600), 4 g. of tetraethyl ortho-silicate, and 2 g. of stannous octoate catalyst. The equivalent ratio of tetraethyl orhto-silicate to polybutadiene-acrylonitrile copolymer 15 is 1. The reaction mixture is thoroughly mixed and allowed to remain in a vessel opened to the atmosphere overnight. The reaction product is an excellent sticky gel.

Another gel is prepared in a similar manner with 8 g. of tetraethyl ortho-silicate, 100 g. of polybutadiene-arcylonitrile copolymer 15 and 2 g. of stannous octoate catalyst. The equivalent ratio of tetraethyl ortho-silicate to polybutadiene-acrylonitrile copolymer 15 is 2. The reaction product is a firm gel.

It is claimed:

1. A polymeric gel which is the reaction product of a tetraalkyl ortho-silicate and intermediate polyhydroxy polymer in an equivalent ratio of about 0.25 to 3, in which reaction product the tetraalkyl ortho-silicate is at least partially hydrolyzed with hydroxyl groups of the intermediate polyhydroxy polymer in the presence of an effective, catalytic amount of an alkanoic acid salt of a metal selected from the group consisting of tin, lead and cobalt until gel formation occurs to form silicon-oxygen-carbon linkages therebetween, said intermediate polyhydroxy polymer having an average of at least about 1.8 predominantly primary, terminal, allylic hydroxyl groups per molecule and being an addition polymer of 0 to about 75 percent by weight of an alpha-monoolefin monomer of two to about 12 carbon atoms, and about 25 to 100 percent by weight of a 1,3-diene hydrocarbon monomer of four to about 12 carbon atoms, said intermediate polyhydroxy polymer further having a viscosity at 30° C. of about 5–20,000 poises, the majority of its unsaturation in the main carbon chain, and a number average molecular weight of about 400 to 25,000.

2. A polymeric gel of claim 1 wherein said 1,3-diene is butadiene.

3. A polymeric gel of claim 1 wherein said 1,3-diene is butadiene and said alpha-monoolefin is acrylo-nitrile.

4. A polymeric gel of claim 1 wherein said tetraalkyl ortho-silicate is tetraethyl ortho-silicate.

5. A polymeric gel of claim 1 in which the equivalent ratio of tetraalkyl ortho-silicate to said intermediate polyhydroxy polymer is from about 1 to 3.

6. A polymeric gel of claim 1 wherein said intermediate polyhydroxy polymer has an average of from about two to three predominantly primary, terminal, allylic hydroxyl groups per molecule and is a liquid addition polymer consisting essentially of 1,3-butadiene, said intermediate polyhydroxy polymer having a viscosity at 30° C. of about 15 to 5000 poises, having the majority of its unsaturation in the main carbonic chain, and a number average molecular weight of about 900 to 10,000.

7. A polymeric gel of claim 1 wherein each alkyl group of said tetraalkyl ortho-silicate is of up to about 12 carbon atoms.

8. A process for preparing a polymeric gel, which gel is the reaction product of a tetraalkyl ortho-silicate and an intermediate polyhydroxy polymer in which reaction product the tetraalkyl ortho-silicate is at least partially hydrolyzed with the hydroxyl groups of the intermediate polyhydroxy polymer to form silicon-oxygen-carbon linkages therebetween, said intermediate polyhydroxy polymer having an average of at least about 1.8 predominantly primary, terminal, allylic hydroxyl groups per molecule and being an addition polymer of 0 to about 75 percent by weight of an alpha-monoolefin monomer of two to about 12 carbon atoms, and about 25 to 100 percent by weight of a 1,3-diene hydrocarbon monomer of four to about 12 carbon atoms, said intermediate polyhydroxy polymer further having a viscosity at 30° C. of about 5–20,000 poises, a majority of its unsaturation in the main carbon chain, and a number average molecular weight of about 400 to 25,000 which process comprises at least partially hydrolyzing said tetraalkyl ortho-silicate with hydroxyl groups of said intermediate polyhydroxy polymer in the presence of an effective, catalytic amount of an alkanoic acid salt of a metal selected from the group consisting of tin, lead and cobalt until gel formation occurs.

9. A process for preparing a polymeric gel of claim 8 which comprises at least partially hydrolyzing a mixture of said tetraalkyl ortho-silicate with hydroxyl groups of said intermediate polyhydroxy polymer in equivalent ratio of about 1 to 3 and a small amount of water in the presence of an effective, catalytic amount of stannous octoate at a temperature in the range of room temperature to about 100° C. until gel formation occurs.

10. A process for preparing a polymeric gel of claim 8 which comprises at least partially hydrolyzing a mixture of said tetraalkyl ortho-silicate with hydroxyl groups of said intermediate polyhydroxy polymer in the presence of an effective, catalytic amount of stannous octoate and in contact with the atmosphere until gel formation occurs, said tetraalkyl ortho-silicate being tetraethyl ortho-silicate and said intermediate polyhydroxy polymer having an average of from about two to three predominantly primary, terminal, allylic hydroxyl groups per molecule and being a liquid addition polymer of 0 to about 75 percent by weight of acrylonitrile and about 25 to 100 percent by weight of 1,3-butadiene, said intermediate polyhydroxy polymer having a viscosity at 30° C. of about 15 to 5,000 poises, having the majority of its unsaturation in the main carbon chain, and a number average molecular weight of about 900 to 10,000.

* * * * *

UNITED STATES PATENT OFFICE
CERTIFICATE OF CORRECTION

Patent No. 3,624,014           Dated November 30, 1971

Inventor(s) Robert A. Moore and Patrick W. Ryan

It is certified that error appears in the above-identified patent and that said Letters Patent are hereby corrected as shown below:

Column 1, Line 27, "1,3 1,3-diene" should read --1,3-diene--

Column 3, Line 1, "1,2-diene" should read --1,3-diene--

Column 3, Line 3, "at 30° of" should read --at 30°C of"

Column 3, Line 39, "10,000 In" should read --10,000. In--

Column 3, Line 50, "2.1 to 2.18" should read --2.1 to 2.8--

Column 3, Line 65, "hydrogen alkyl" should read --hydrogen, alkyl--

Column 3, Line 70 "2-phenyl-b-1,3" should read 2-phenyl-1,3--

Column 4, Line 13 "indiscriminate premature" should read --indiscriminate, premature--

Column 4, Line 33, "solvent-system" should read --solvent system--

Column 5, Line 15, "Olefinically unsaturated" should read --Olefinically-unsaturated--

Column 5, Line 69, "216 poises" should read --46 poises--

Column 5, Line 70, "meg./gm" should read --meq./gm--

Column 5, Line 71, "of 2.7" should read --of 47--

Column 6, Line 21, "2-1/" should read --2-1/2--

Column 6, Line 22, "15 is typically" should read --15 typically--

Column 6, Line 24, "meg./gm." should read --meq./gm.--

UNITED STATES PATENT OFFICE
CERTIFICATE OF CORRECTION

Patent No. 3,624,014            Dated November 30, 1971

Inventor(s) Robert A. Moore and Patrick W. Ryan     PAGE - 2

It is certified that error appears in the above-identified patent and that said Letters Patent are hereby corrected as shown below:

Column 6, Line 24, "215" should read --45--

Column 7, Lines 45-46, "carbonic" should read --carbon--

Signed and sealed this 9th day of May 1972.

(SEAL)
Attest:

EDWARD M. FLETCHER, JR.        ROBERT GOTTSCHALK
Attesting Officer               Commissioner of Patents